(12) United States Patent
Rasmussen et al.

(10) Patent No.: US 7,993,617 B2
(45) Date of Patent: Aug. 9, 2011

(54) ALKALI RESISTANT CATALYST

(75) Inventors: Soren Birk Rasmussen, Soborg (DK); Arkady Kustov, Copenhagen (DK); Rasmus Fehrmann, Copenhagen (DK); Johannes Due-Hansen, Gentofte (DK)

(73) Assignee: Technical University of Denmark, Lyngby (DK)

( * ) Notice: Subject to any disclaimer, the term of this patent is extended or adjusted under 35 U.S.C. 154(b) by 59 days.

(21) Appl. No.: 12/441,146

(22) PCT Filed: Sep. 25, 2007

(86) PCT No.: PCT/DK2007/000416
§ 371 (c)(1),
(2), (4) Date: Jul. 6, 2009

(87) PCT Pub. No.: WO2008/037255
PCT Pub. Date: Apr. 3, 2008

(65) Prior Publication Data
US 2009/0285741 A1 Nov. 19, 2009

Related U.S. Application Data

(60) Provisional application No. 60/847,099, filed on Sep. 26, 2006.

(30) Foreign Application Priority Data

Sep. 25, 2006 (EP) .................................... 06019991

(51) Int. Cl.
*B01D 53/56* (2006.01)
*B01J 23/72* (2006.01)
*B01J 23/745* (2006.01)
*B01J 35/00* (2006.01)

(52) U.S. Cl. .................. 423/239.1; 502/345; 502/325; 502/353; 502/305; 502/324; 502/300

(58) Field of Classification Search ............... 423/239.1; 502/345, 325, 353, 305, 324, 300
See application file for complete search history.

(56) References Cited

U.S. PATENT DOCUMENTS

| 5,401,478 | A | * | 3/1995 | Chang et al. | ................... | 423/235 |
| 5,552,128 | A | * | 9/1996 | Chang et al. | ................... | 423/235 |
| 6,521,559 | B1 | | 2/2003 | Long et al. | | |
| 2005/0159304 | A1 | * | 7/2005 | Ichiki et al. | ................... | 502/216 |

FOREIGN PATENT DOCUMENTS

WO 0216026 A2 2/2002

OTHER PUBLICATIONS

J.P. Chen et al., "Selective Catalytic Reduction of NO with NH3 on SO4 2/TiO2 Superacid Catalyst", Journal of Catalysis 139, 277-288 (1993).
Arata, "Preparation of Superacids by Metal Oxides for Reactions of Butanes and Pentanes", Applied Catalysis A: General 146 (1996) 3-32.
Deo et al., "Effect of Additives on the Structure and Reactivity of the Surface Vanadium Oxide Phase in V2O5/TiO2 Catalysts", Journal of Catalysis 146, 335-345 (1994).
Kustov et al., "Vanadia on sulphated-ZrO2, a promising catalyst for NO abatement with ammonia in alkali containing flue gases", Applied Catalysis B: Environmental 58 (2005) 97-104.
Parvulescu et al., "Catalytic removal of NO", Catalysis Today 46 (1998) 233-316.
Topsoe et al., "Vanadia/Titania Catalysts for Selective Catalytic Reduction (SCR) of Nitric Oxide by Ammonia", Journal of Catalysis 151, 226-240 (1995).
Wachs et al., "Structure and reactivity of surface vanadium oxide species on oxide supports", Applied Catalysis A: General 157 (1997) 67-90.
Waqif et al., "Acidic properties and stability of sulfate-promoted metal oxides", Journal of Molecular Catalysis, 72 (1992) 127-138.
J.P. Chen et al., "Mechanism of Poisoning of the V2O5/TiO2 Catalyst for the Reduction of NO by NH3", Journal of Catalysis 125, 411-420 (1990).
Cheung et al., (1998) "Sulfated zirconia and iron- and manganese-promoted sulfated zirconia: do they protonate alkanes?", Topics in Catalysis 6 (1998) 41-47.
Kustov et al., "Activity and deactivation of sulphated TiO2- and ZrO2-based V, Cu, and Fe oxide catalysts for N0 abatement in alkali containing flue gases" Aplied Catalysis B: Environmental, Elsevier, [online], vol. 76, No. 1-2, May 3, 2007, pp. 9-14, XP022290228, ISSN: 0926-3373, Retrieved from the Internet: URL:doi:10.1016/j.apcatb.2007.05.00>, [retrieved on Dec. 11, 2007], the whole document.
Due-Hansen et al., "Tungstated zirconia as promising carrier for DeNOX catalysts with improved resistance towards alkali poisoning" Applied Catalysis B: Environmental, Elsevier, vol. 66, No. 3-4, Jul. 20, 2006, pp. 161-167, XP0005456277, ISSN: 0926-3373, the whole document.

(Continued)

Primary Examiner — Timothy C Vanoy
(74) Attorney, Agent, or Firm — Fish & Richardson P.C.

(57) ABSTRACT

The present invention concerns the selective removal of nitrogen oxides (NOx) from gasses. In particular, the invention concerns a process, a catalyst and the use of a catalyst for the selective removal of nitrogen oxides in the presence of ammonia from gases containing a significant amount of alkali metal and/or alkali-earth compounds which process comprises using a catalyst combined of (i) a formed porous superacidic support, said superacidic support having an Hammett acidity stronger than Ho=−12, and (ii) a metal oxide catalytic component deposited on said superacidic support selected from the group consisting of oxides of Fe, Cu, V, Cr, Mn, and any mixtures thereof.

19 Claims, 5 Drawing Sheets

OTHER PUBLICATIONS

Zheng et al., "Deactivation of V2O5-WO3-TiO2 SCR catalyst at a biomass-fired combined heat and power plant" Applied Catalysis B: Environmental, Elsevier, vol. 60, No. 3-4, Oct. 3, 2005, pp. 253-264, XP005095700, ISSN: 0926-3373, cited in the application, the whole document.

Pietrogiacomi et al., "Insitu sulphated CuOx/ZrO2 and CuOxlsulphated-ZrO2 as catalysts for the reduction of NOx with NH3 in the presence of excess O2" Applied Catalysis B: Environmental, Elsevier, vol. 60, No. 1-2, Sep. 1, 2005, pp. 83-92, XP004981865, ISSN: 0926-3373, abstract.

Choo et al., "Charatcteristics of V2O5 supported on sulfated TiO2 for selective catalytic reduction of NO by NH3" Applied Catalysis A: General, Elsevier Science, Amsterdam, NL, vol. 200, No. 1-2, Aug. 28, 2000, pp. 177-188, XP004272459, ISSN: 0926-860X, abstract; table 1.

Indovina et al., "The catalytic activity of FeOx/ZrO2 and FeOx/sulphated-ZrO2 for the NO abatement with C3H6 in the presence of excess O2", Applied Catalysis B: Environmental, Elsevier, vol. 60, No. 1-2, Sep. 1, 2005, pp. 23-31, XP004981858, ISSN: 0926-3373, abstract.

Due-Hansen et al., "Vandia-based SCR catalysts supported on tungstated and sulfated zirconia: Influence of doping. with potassium" Journal of Catalysis, Academic Press, Duluth, MN, US, vol. 251, No. 2 Oct. 1, 2007, pp. 459-473, XP022282949, ISSN: 0021-9517, the whole document.

\* cited by examiner

| Support | $S_{BET}$ (m²/g) | Total acidity (desorbed $NH_3$ μmol/g) | $T_{max}$ of $NH_3$ desorption (°C) | Detected phase (XRD) |
|---|---|---|---|---|
| $TiO_2$ | 79,8 | 208 | 275 | Anatase |
| sulphated-$TiO_2$ | 65,7 | 219 | 285 | Anatase |
| $ZrO_2$ | 69,2 | 66 | 240 | Monoclinic |
| sulphated $ZrO_2$ | 69,5 | 357 | 290 | Monoclinic |

Figure 1

| Catalyst | Catalyst abbreviation | Molar content, μmol/g | | K/Me molar ratio |
|---|---|---|---|---|
| | | V, Fe, Cu | K[1] | |
| $V_2O_5/TiO_2$ | VT | 371 | 174 | 0,47 |
| $V_2O_5/ZrO_2$ | VZ | 514 | 102 | 0,20 |
| $V_2O_5$/sulphated-$TiO_2$ | VTS | 333 | 156 | 0,47 |
| $V_2O_5$/sulphated-$ZrO_2$ | VZS | 348 | 177 | 0,51 |
| $CuO/TiO_2$ | CT | 461 | 159 | 0,34 |
| $CuO/ZrO_2$ | CZ | 376 | 164 | 0,44 |
| CuO/sulphated-$TiO_2$ | CTS | 589 | 172 | 0,29 |
| CuO/sulphated-$ZrO_2$ | CZS | 377 | 169 | 0,45 |
| $Fe_xO_y/TiO_2$ | FT | 382 | 156 | 0,41 |
| $Fe_xO_y/ZrO_2$ | FZ | 172 | 192 | 1,11 |
| $Fe_xO_y$/sulphated-$TiO_2$ | FTS | 353 | 133 | 0,38 |
| $Fe_xO_y$/sulphated-$ZrO_2$ | FZS | 142 | 33 | 0,23 |

(1) Potassium doped catalyst are designated by the addition of the letter "K" in the beginning

Figure 2

| Sample | K/Me molar ratio | Total acidity (desorbed NH$_3$, μmol/g) | | T$_{max}$ of NH$_3$ desorption (°C) | |
|---|---|---|---|---|---|
| | | Undoped | K-doped | Undoped | K-doped |
| VT | 0,47 | 266 | 91 | 260 | 230 |
| CT | 0,34 | 284 | 243 | 205 | 185 |
| FT | 0,41 | 322 | 123 | 260 | 205 |
| VZ | 0,20 | 195 | 73 | 215 | 170 |
| CZ | 0,44 | 235 | 130 | 230 | 215 |
| FZ | 1,11 | 123 | 23 | 215 | 190 |
| VTS | 0,47 | 210 | 35 | 222 | 178 |
| CTS | 0,29 | 345 | 166 | 210 | 200 |
| FTS | 0,38 | 206 | 195 | 245 | 220 |
| VZS | 0,51 | 235 | 216 | 230 | 245 |
| CZS | 0,45 | 627 | 565 | 305 | 225 |
| FZS | 0,23 | 432 | 452 | 275 | 255 |

Figure 3

ALKALI RESISTANT CATALYST

CROSS REFERENCE TO PRIOR APPLICATIONS

This is the U.S. National Phase application under 35 U.S.C. §371 of International Patent Application No. PCT/DK2007/000416, filed Sep. 25, 2007, and claims the benefit of European Patent Application No. 06019991.6, filed Sep. 25, 2006 and U.S. Provisional Application No. 60/847,099, filed Sep. 26, 2006, both of which are incorporated by reference herein. The International Application published in English on Apr. 3, 2008 as WO 2008/037255 under PCT Article 21(2).

FIELD OF THE INVENTION

The present invention concerns the selective removal of nitrogen oxides (NOx) from gasses. In particular, the invention concerns a process, a catalyst and the use of a catalyst for removal of NOx from exhaust or flue gases, said gases comprising alkali or earth alkali metals. Such gases comprise for example flue gases arising from the burning of biomass, combined biomass and fossil fuel, and from waste incineration units. The process comprises the selective catalytic reduction (SCR) of NOx, such as nitrogen dioxide ($NO_2$) and nitrogen oxide (NO) with ammonia ($NH_3$) as reductant.

BACKGROUND OF THE INVENTION

The use of biomass fuels is considered more and more advantageous, as biomass fuels are $CO_2$ neutral, i.e. they discharge the same amount $CO_2$ when burned, as they absorbed from the air while growing. Unfortunately, alkali metals and earth alkali metals are present in relatively large amounts in flue gases from burning of biomass or biomass fuel such as straw, woodchips and wood pellets.

A common method to catalytically reduce NOx in flue gasses is the selective catalytic reduction (SCR) using ammonia ($NH_3$) as reductant. The production of NOx occurs in practically any high temperature process regardless of the fuel since NOx is formed by oxidation of atmospheric $N_2$ in a flame or in a cylinder of a car engine. $N_2$ is harmless, and constitutes around 75% of the atmosphere. The nitrogen in the fuel is of lower concern for NOx emission. Generally, NOx is an environmental problem, including acid rain formation; NOx is also considered to be harmful for human and animal health.

Established catalysts for SCR comprises e.g. oxides of $V_2O_5$ and $MoO_3$ or $WO_3$ supported on $TiO_2$, which possess a very high catalytic activity.

However, these catalysts are not suitable for SCR of NOx of flue gases containing large amount of alkali and earth alkali metals, such as flue gases from biomass fuels. When these conventional catalysts are loaded with alkali earth metals or alkali metals, especially with potassium, this results in (i) a considerable decrease of catalytic activity, as well as (ii) to a shift of the maximum catalytic activity towards lower temperatures, both features that are highly undesired. In particular, the relative activity of a vanadium based catalyst decreases severely when the catalyst is poisoned with alkali metals.

It is assumed that both the alkali earth and alkali metals deactivate the conventional SCR catalyst by destruction of the essential acid sites on the surface of the catalyst (J. P. Chen, R. T. Yang, J. Catal. 125 (1990)411; Y. Zheng, A. D. Jensen, J. E Johnsson, Appl. Catal. B 60(2005)253). The severity of deactiation is proportional to the basicity of the metal oxides, where potassium oxide—due to its significant presence in the biomass fly ash combined with its high basicity—commonly constitutes the main problem.

It has been reported by A. L. Kustov, M. Yu. Kustova, R. Fehrmann, P. Simonsen, Appl. Catal. B 58(2005)97 that a catalyst having vanadium pentoxide ($V_2O_5$) supported on sulphated zirconium dioxide ($ZrO_2$) reveals a higher resistance towards alkali poisoning than $V_2O_6$ supported on titanium dioxide ($TiO_2$). However, a drawback in the use of vanadium-based catalysts in the SCR of flue gases from biomass is that vanadium is both more expensive and, except for Cr, more toxic than many other catalysts.

Consequently, there is a need for a relatively cheap, robust and non-toxic catalyst suitable for the selective catalytic reduction (SCR) of NOx in flue gases derived from burning biomass.

SUMMARY OF THE INVENTION

One aspect of the present invention concerns a process for the selective removal of nitrogen oxides in the presence of ammonia from gases containing a significant amount of alkali metal and/or alkali-earth compounds which process comprises using a catalyst combined of
 a) a formed porous superacidic support
 b) a metal oxide catalytic component deposited on said support selected from the group consisting of Cu, V, Fe, Cr, Mn, and any mixtures thereof.

Another aspect of the invention relates to a catalyst in the process of the selective removal of nitrogen oxides in the presence of ammonia from gases containing a significant amount of alkali metal and/or alkali-earth compounds which process comprises using a catalyst combined of
 a) a formed porous superacidic support
 b) a metal oxide catalytic component deposited on said support selected from the group consisting of Cu, V, Fe, Cr, Mn, and any mixtures thereof.

A further aspect of the invention pertains to the use of a catalyst for the selective removal of nitrogen oxides in the presence of ammonia from gases containing a significant amount of alkali metal and/or alkali-earth compounds which process comprises using a catalyst combined of
 a) a formed porous superacidic support
 b) a metal oxide catalytic component deposited on said support selected from the group consisting of Cu, V, Fe, Cr, Mn, and any mixtures thereof.

FIGURES

FIG. 1 provides a table listing structure, textural and acidity data for the used supports.

FIG. 2 provides a table showing a summary of the prepared catalysts.

FIG. 3 provides a table revealing results of TPD-$NH_3$ measurements for undoped and potassium-doped systems.

DETAILED DESCRIPTION OF THE INVENTION

Figure 4:
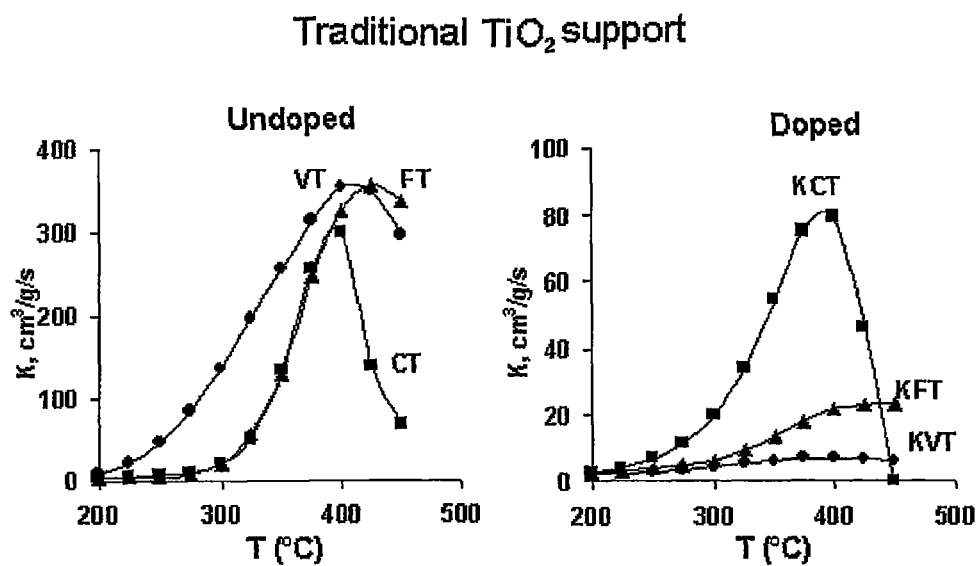
FIG. 4 shows the temperature dependency of the first-order rate constant for undoped and K-doped oxides of V, Cu, and Fe supported on $TiO_2$.

One aspect of the present invention concerns a process for the selective removal of nitrogen oxides in the presence of ammonia from gases containing a significant amount of alkali metal and/or alkali-earth compounds which process comprises using a catalyst combined of
  a) a formed porous superacidic support
  b) a metal oxide catalytic component deposited on said support selected from the group consisting of Cu, Fe, V, Cr, Mn, and any mixtures thereof.

Another aspect of the invention relates to a catalyst in the process of the selective removal of nitrogen oxides in the presence of ammonia from gases containing a significant amount of alkali metal and/or alkali-earth compounds which process comprises using a catalyst combined of
  a) a formed porous superacidic support
  b) a metal oxide catalytic component deposited on said support selected from the group consisting of Cu, Fe, V, Cr, Mn, and any mixtures thereof.

A further aspect of the invention pertains to the use of a catalyst for the selective removal of nitrogen oxides in the presence of ammonia from gases containing a significant amount of alkali metal and/or alkali-earth compounds which process comprises using a catalyst combined of
  a) a formed porous superacidic support
  b) a metal oxide catalytic component deposited on said support selected from the group consisting of Cu, Fe, V, Cr, Mn, and any mixtures thereof.

A superacidic support according to the invention can for example be obtained by the adsorbing of acidic ions, such as sulfate ions onto amorphous or crystalline inorganic oxides of, for example any one of Zr, Ti, Fe, Sn, Si, Al, and/or Hf, and/or any combination thereof, followed by calcination in air. Such a superacidic support can be obtained by depositing acid sulfates (such as $H_2SO_4$, $(NH_4)_2SO_4$ and the like) onto any one of $ZrO_2$, $SnO_2$, $TiO_2$, $Al_2O_3$ and/or $Fe_2O_3$ and/or any combination thereof. In a one embodiment of the invention, the superacidic support comprises a mixture of one or more of $ZrO_2$, $SnO_2$, $TiO_2$, $Al_2O_3$ and $Fe_2O_3$. In a further embodiment of the invention, the support comprises predominantly $ZrO_2$ or $TiO_2$, either $ZrO_2$; $TiO_2$, or a mixture of both. Predominantly can mean more than 50%, 75%; 90%; 92%; 95%; 98%; 99%; 99.5%; 99.9%; 99.95%; 99.995%; or 99.999% by weight.

In the context of the present invention, the terms "around", "about", or "approximately" are used interchangeably and refer to the claimed value, and may include variations as large as +/−0.1%, +/−1%, or +/−10%. Especially in the case of $log_{10}$ intervals, the variations may be larger and include the claimed value +/−50%, or 100%. The terms "around", "about", or "approximately" may also reflect the degree of uncertainty and/or variation that is common and/or generally accepted in the art.

A superacid can be defined as an acid with acidity greater than that of 100% sulfuric acid ($H_2SO_4$). A super acid can also be defined as a solid acid stronger than $H_0=-12$ (Hammett acidity), which corresponds to the acid strength of 100% $H_2SO_4$. Some simple superacids include trifluoromethanesulfonic acid ($CF_3SO_3H$), also known as triflic acid, and fluorosulfonic acid ($FSO_3H$), both of which are about a thousand times stronger than sulfuric acid. In many cases, the superacid is not a single compound, but is instead a system of several compounds that are combined to effect high acidity. It is generally considered difficult to determine the Hammett acidity of solid compounds.

The superacidic supports provided by depositing acid sulfates (such as $H_2SO_4$, $(NH_4)_2SO_4$ and the like) onto $ZrO_2$, $SnO_2$, $TiO_2$, $Al_2O_3$ and/or $Fe_2O_3$ optionally with/without $WO_3$, $MoO_3$ or $B_2O_3$ are believed to possess a Hammett acidity stronger than $H_0=-12$. The Hammett acidity of sulfatised $ZrO_2$ has been measured to be −16.04 (Cheung, T.-K.; Gates, B. C. (1998), Topics In Catalysis, Vol. 6 Issue. 4, p. 41-47), and sulfatised MO—ZrO2 (M=V, Cu or Fe) is apparently much more acidic. Judged from NH3 temperature desorption experiments, it is up to 200% more acidic than sulfatised MO—TiO2 (A. L. Kustov, S. B. Rasmussen, R. Fehrmann, P. Simonsen, Appl. Catal. B, (2007), in press).

In one embodiment the support has a total porosity of up to 0.1; 0.2; 0.3; 0.4; 0.5; 0.6; 0.7; 0.8; or 0.9 $cm^3/cm^3$. In a further embodiment, the support has a total porosity of between 0.5 and 1.0; between 0.6 and 0.9; or between 0.7 and 0.8. Commonly, porosity is defined as pore volume/total volume of particle. Generally, high porosities are desirable. Thereby a high ratio of active material per weight or volume, e.g. kg or liter, can be achieved. Often, porosities lie in the range of 0.5 to 0.8.

In one embodiment of the invention, the superacidic support has a surface area between 1 and 1000 $m^2/g$; 10 and 500 $m^2/g$; 25 and 400 $m^2/g$, 40 and 300 $m^2/g$; 50 and 100 $m^2/g$; 60 and 90 $m^2/g$; or between 70 and 80 $m^2/g$. Generally, surface areas as large as possible are desired, as the catalytic activity is considered to be proportional to the surface area. Currently, the state of the art for surface areas of catalytic supports is believed to be in the range of 400-500 $m^2/g$. In a further embodiment of the invention, the surface area is thus between 50 and 500 $m^2/g$; 100 and 500 $m^2/g$; 200 and 500 $m^2/g$, 300 and 500 $m^2/g$, 350 and 450 $m^2/g$, or 400 and 500 $m^2/g$.

According to the present invention, the catalytically active metal oxide deposited on the superacidic support is present in an amount of 0.01-1%; 0.5-2%; 1-5%; 2-5%; 2.5-10%; 5-12%; or 10-25% by weight of the superacidic support. In a further embodiment, the catalytically active metal oxide component is present in an amount in the range of 5 to 50%, or 10 to 40%, or 22 to 28%, or around 25% by weight of the superacidic support. With respect to catalysts, higher surface areas allow for a larger quantity of catalyst to be provided, preferably without exceeding an atomic monolayer. When the thickness of said layer becomes wider, the catalytic activity is reduced significantly. Thus, too high percentages of catalytically active metal oxides are not desirable.

The catalyst deposited on the superacidic support according to the invention may comprise oxides of Cu, V, Fe, Cr, and Mn, and any mixtures or combinations thereof, deposited on a superacidic support. Such oxides comprise CuO, $V_2O_5$, $Fe_2O_3$, $CrO_3$, and $MnO_2$; other oxidation forms or mixed oxides may be suitable as well. In one embodiment of the invention, the metal oxides deposited on the superacidic support comprise only one metal oxide selected from the group consisting of: Cu, V, Fe, Cr, and Mn. In another embodiment, the metal oxides deposited on the superacidic support comprise two, three, four, or five metal oxides selected from the group consisting of: Cu, V, Fe, Cr, and Mn. In a further embodiment, the metal oxides deposited on the superacidic support comprise predominantly Cu and/or Fe oxides, such as more than 90%; 92%; 95%; 98%; 99%; 99.5%; 99.9%; 99.95%; 99.995%; or 99.999%. In yet another embodiment, the molar amount of vanadium oxide(s) in the metal oxides deposited on the superacidic support is less than 100%; 90%; 80%; 70%; 60%; 50%; 40%; 30%; 20%; 10%; 1%; 0.1%;

0.01%; 0.001%; 0.0001%; 0.00001%; or 0.000001% of the mixture of oxides of Cu, Fe, Cr, V and/or Mn deposited on the superacidic support.

Apart from oxides of Cu, V, Fe, Cr, and Mn, and mixtures thereof, the catalyst deposited on the superacidic support according to the invention may also comprise oxides of W, Mo and B, such as $WO_3$, $MoO_3$ or $B_2O_3$. Thus, in a one embodiment of the invention, the catalyst deposited on the superacidic support comprises a mixture of one or more of $ZrO_2$, $SnO_2$, $TiO_2$, $Al_2O_3$ and $Fe_2O_3$. In a further embodiment of the invention, the mixture comprises one or more of $ZrO_2$, $SnO_2$, $TiO_2$, $Al_2O_3$, $Fe_2O_3$, $WO_3$, $MoO_3$ or $B_2O_3$. The addition of $WO_3$, $MoO_3$ or $B_2O_3$ to the catalyst deposited on the superacidic support inhibits the unwanted oxidation of $SO_2$ to $SO_3$ in the flues gas compared to catalysts not containing these additives. Oxidation of $SO_2$ leads to "blue smoke" from the chimney and increases acid rain. The molar or weight ratios between oxides of Cu, V, Fe, Cr, and Mn and $WO_3$, $MoO_3$ or $B_2O_3$ may vary. The ratios may vary but are typically within range of 10:1 to 1:1 by weight between added $WO_3$, $MoO_3$ or $B_2O_3$ and oxides of Cu, V, Fe, Cr, and Mn. By addition of one or more of $WO_3$, $MoO_3$ or $B_2O_3$, oxidation of $SO_2$ to $SO_3$ is inhibited, while NOx is reduced to $N_2$ according to the invention. In yet a further embodiment, the support comprises a molar ratio of one or more of $ZrO_2$, $SnO_2$, $TiO_2$, $Al_2O_3$ and $Fe_2O_3$ to one or more of oxides of Cu, V, Fe, Cr, and Mn, optionally including $WO_3$, $MoO_3$ or $B_2O_3$ of more than 1000:1; or between 1000:1 and 100:1; 100:1 and 10:1; 10:1 and 1:1; 1:1 and 1:10; 1:10 and 1:100; 1:100 and 1:1000; or less than 1:1000.

The catalyst can for example be shaped as monolith, extrudate, bead or plate, where the active phases can be introduced to the conformed material either by wash-coating, extrusion or spray painting, methods that are generally well-established in the art. According to one embodiment of the invention, the catalyst according to the invention is provided in a form that provides minimal resistance to the flue gases, such as minimal pressure loss, while still providing reliable catalytic conversion of NOx to $N_2$. Generally, shapes, dimensions and designs of such a catalyst are known in the art.

One embodiment of the invention concerns the process of selectively removing nitrogen oxides with ammonia from gases resulting from the burning of biomass, combined biomass-fossil fuel or emerging from waste incineration units at a temperature from about 150° C. to about 550° C. Commonly, for low temperature applications, such as placement of the catalyst unit in the flue gas duct after dust filtration in waste incineration plants, the temperature of the flue gas is in the range of 150-300° C. In the case of high temperature applications, such as placement of the catalyst unit at high dust positions in the flue gas duct, the temperature of the flue gas is often in the range of 340-420° C. For intermediate temperature applications, the temperature of the flue gas is in the area of about 250-370° C.

Commonly, one or more heat exchange units are provided in order to utilize the thermal energy of the flue gas. In one embodiment, the SCR process according to the invention takes place before a heat exchange unit. In a further embodiment, the SCR process is conducted after a heat exchange unit. In yet another embodiment, the SCR process takes place in between heat exchange units. In still another embodiment, heat controlling means are provided in order to control the temperature of the flue gas before and/or during the SCR. Thereby the efficiency of the SCR process can be controlled and/or optimized for the respective catalyst according to the invention, and its temperature profile with respect to catalytic activity. Such heat controlling means may comprise means to alter the rate of combustion, means to alter the flow of gas and the like. Generally, such means are well-known in the art.

Very often, fuels containing alkali metals as well as earth alkali will also contain significant amounts of alkali metals as well as earth alkali in the resulting flue gases upon incineration or burning. Fossil fuels, such as oil, natural gas and coal contain lower amounts of alkali metals and earth alkali metals. Waste, such as waste burned in waste incineration plants contains high levels of alkali metals as well as earth alkali metals. Biomass or biomass fuel such as straw, woodchips and wood pellets contain very high levels of alkali metals, especially K, as well as earth alkali metals. In the case of fly ash from burning straw, alkali metals and earth alkali metals can comprise as much as half of the total weight of the fly ash.

By the use of a catalyst according to the invention, the lifetime can be increased significantly compared to conventional catalyst non-superacidic catalyst, i.e. catalysts without superacidic support. In one embodiment of the invention, the life time of the catalyst is increased by a factor of at least 1.5; 1.5-3.0; 3.0-5.0; 5.0-10; or 100, compared to a similar/comparable catalyst without superacidic support. In a further embodiment of the invention, the lifetime of the catalyst according to the invention is 2-5 times compared to a comparable catalyst without superacidic support. Apart from economical benefits, this also provides a greater flexibility with respect to exchange and/or cleaning of the catalyst. By a larger window of opportunity for when to close the plant for exchange, cleaning, or reactivation of the catalyst, sensitive time periods may be avoided. For many applications, a shut down during summer is less expensive than during winter.

A further advantage of a catalyst and its use according to the current invention is that, if desired, the volume or amount of catalyst can be reduced, compared to conventional catalysts, thus e.g. providing a reduction in pressure drop/resistance in the gas flow, a feature that is often desired.

A catalyst according to the present invention can be treated and handled using conventional methods and techniques in the field. The catalyst can also be cleaned/washed and recycled.

EXPERIMENTS $TiO_2$ in anatase form was supplied from Degussa. $ZrO_2$ was prepared by calcination of hydrous zirconia at 500° C. for 4 h in air. Sulphation was performed by impregnation of respectively $TiO_2$ and $ZrO_2$ with a 1 M solution of $H_2SO_4$ at room temperature (acid volume/powder weight ratio was 30 ml/g). The summary of textural and acidic characteristics of the resulting supports used is given in the table of FIG. 1.

Three transition metal oxides were introduced using incipient wetness impregnation with oxalates or sulphates of corresponding metals to obtain metal oxide loading 3.5 wt %. The potassium doped catalysts were prepared by impregnation with a solution of $KNO_3$ to obtain a potassium concentration of 0.156 mmol/g, corresponding to a K/Me molar ratio of 0.4. If not mentioned opposite, all the samples were then calcined at 450° C. in a dry air flow for 5 h. Afterwards samples where pressed into tablets, crushed, and sieved to obtain a fraction of particles between 0.18-0.295 mm. The resulted catalysts and their abbreviation used further are given in the table of FIG. 2.

The metal content in these samples was determined by atomic absorption spectroscopy (AAS). X-ray powder diffraction patterns were collected by a Philips powder diffractometer with Ni-filtered Cu-Kα radiation. The 2θ scans covered the range 20-70°. Nitrogen adsorption measurements were performed at liquid nitrogen temperature on a Micromeritics Gemini analyzer. The samples were heated to 200° C. for 1 h prior to the measurements. The total surface area was calculated according to the BET method.

Temperature-programmed desorption of ammonia ($NH_3$-TPD) was performed by the following procedure: 100-150 mg of the sample was loaded into a quartz tube reactor and calcined at 400° C. in a flow of dry air (2 h, 60 ml/min) and then in dry nitrogen (2 h, 60 ml/min). Thereafter the sample was cooled to room temperature and kept in a flow of dry $NH_3$ for 30 min. Then, the reactor with the sample was closed and left overnight. Before the $NH_3$ desorption measurement, the sample was heated to 100° C. in a dry nitrogen flow (100 ml/min) and kept at this temperature for 1 h to remove physically adsorbed ammonia. Then the sample was cooled to room temperature and the temperature was thereafter raised at a rate of 5°/min up to 650° C. The rate of $NH_3$ desorption was monitored by a computer-interfaced UV-Vis spectrometer using the characteristic ammonia band at 207 nm. The ammonia concentration was calculated on the basis of the intensity of this characteristic band using a calibration curve. The total amount of desorbed $NH_3$ was calculated from the area under the TPD curve.

The SCR activity measurements were carried out in a fixed-bed reactor. 50 mg of the catalyst (fraction 0.18-0.295 mm) was used in this work. The typical reactant gas composition was: 1000 ppm NO, 1100 ppm $NH_3$, 3.5% $O_2$, 3% $H_2O$, and balance $N_2$. The total flow rate was maintained at 300 ml/min (ambient conditions). The NO concentration was continuously monitored by a Thermo Electron's Model 10A Rack-Mounted Chemiluminescent NO—$NO_x$ Gas Analyzer.

Results and Discussion

It is noticed that the specific surface area of the different supports listed in the table of FIG. 1 are quite similar which makes it possible to compare the catalytic properties of the samples obtained on the basis of these supports directly without normalization by the surface area.

The results of the XRD-analysis indicate the presence of only monoclinic $ZrO_2$ phase for $ZrO_2$ and sulphated-$ZrO_2$ carriers and the presence of only anatase phase for $TiO_2$ and sulphated-$TiO_2$. In all cases, no diffraction peaks corresponding to crystalline $V_2O_5$, CuO, or $Fe_xO_y$ was observed for the supported catalysts.

According to the results of $NH_3$-TPD measurements, the sulphation of the $ZrO_2$ leads to the significant increase of the total acidity, determined as the amount of desorbed $NH_3$ molecules per gram of the carrier. The increase of the acidity is less pronounced in the case of titania support. For both carriers the temperature of the maximum ammonia desorption ($T_{max}$) is significantly shifted towards higher temperatures, indicating the formation of stronger acid sites after sulphation procedure. These findings are in a good agreement with the results of Arata, who has identified a range of active oxides, i.e. $ZrO_2$, $Fe_2O_3$, $SmO_2$, $TiO_2$, etc. whose surface properties and mainly surface acidity can be modified with sulphation [K. Arata, Appl. Catal. 143 (1996) 3.]. Among these oxides, which can be used as supports, sulphated zirconia was found to reveal the highest acidic properties.

The molar contents of metals of the catalysts obtained after the impregnation of the supports with salts of V, Fe, and Cu together with the further used abbreviations are given in the table of FIG. 2. It should also be noticed that for all studied systems the surface coverage by the corresponding oxide is less than 3.5 $MeO_x$ per $nm^2$, which approximately corresponds to half a monolayer surface coverage, therefore, supported oxides should be present mainly as isolated and polymeric oxide species.

The catalytic activity of the samples was measured in the temperature range 200-450° C. Pure $TiO_2$, $ZrO_2$, sulphated-$TiO_2$, and sulphated-$ZrO_2$ supports reveal very low NO conversion not exceeding 2-3% at the given conditions. The temperature dependency of the activity measurements for the different carriers before and after poisoning with potassium oxide are shown in FIGS. 4-8. Since the reaction is known to be first order with respect to NO under stoichiometric $NH_3$ conditions [V. I. Pârvulescu, P. Grange, B. Delmon, Catal. Today 46 (1998) 233], the catalytic activity is represented as the first-order rate constant ($cm^3$/g·s) and was calculated from NO conversion as:

$$k = -F_{NO}/(m_{cat} \cdot C_{NO}) \cdot \ln(1-X)$$

where $F_{NO}$ denotes the molar feed rate of NO (mol/s), $m_{cat}$ is the catalyst weight (g), $C_{NO}$ is the NO concentration (mol/$cm^3$) and X is the fractional conversion of NO.

The results for the system based on traditional $TiO_2$ support are presented in FIG. 4. In the absence of potassium poison, all three catalysts reveal comparable catalytical activities with maximum at approximately 400° C.

FIG. 4 shows that a traditional (reference) vanadium based catalyst is more active at lower temperatures, while the activity of the iron-based catalyst is shifted towards higher temperatures. After poisoning with potassium the activity of all samples decrease dramatically. Cu-based catalyst nevertheless retains almost 30% of initial activity while the activity of traditional doped or deactivated vanadium catalyst is less than 5% of the activity of the undoped vanadium catalyst. In this case potassium seems to coordinate preferentially to the sites created by the vanadium (most probably Brønsted acid sites), which are responsible for the ammonia adsorption. Similar conclusion was made in the works of Wachs and coworkers [I. E. Wachs, B. M. Weckhuysen, Appl. Catal. A 137 (1997) 67; G. Deo, I. Wachs, J. Catal. 146 (1994) 335], where they have been studying the effect of additives on the structure and reactivity of $V_2O_5$/$TiO_2$ catalysts. If we take into account the fact that the amount of these catalytical active Brønsted acid sites is estimated to be only about 5-10% of all surface acid sites [4], then it becomes clear why even small amounts of potassium oxide is enough for the almost complete poisoning of the catalyst. The use of the Cu and Fe oxides, which are known to possess mainly Lewis acidity, seems to increase the catalyst resistance towards alkali poisoning to some extent.

Figure 5:
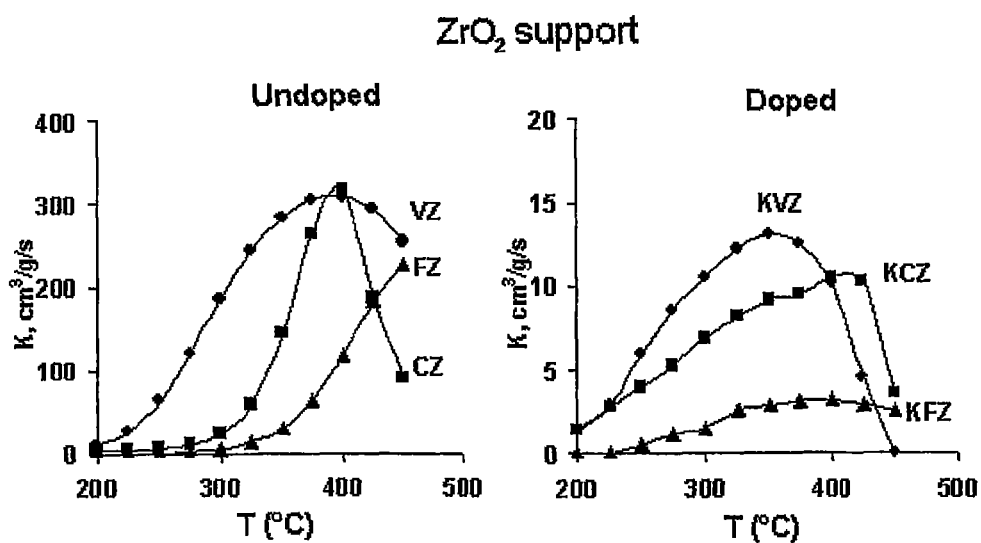
FIG. 5 shows the temperature dependency of the first-order rate constant for undoped and K-doped oxides of V, Cu, and Fe supported on $ZrO_2$.
Figure 6:
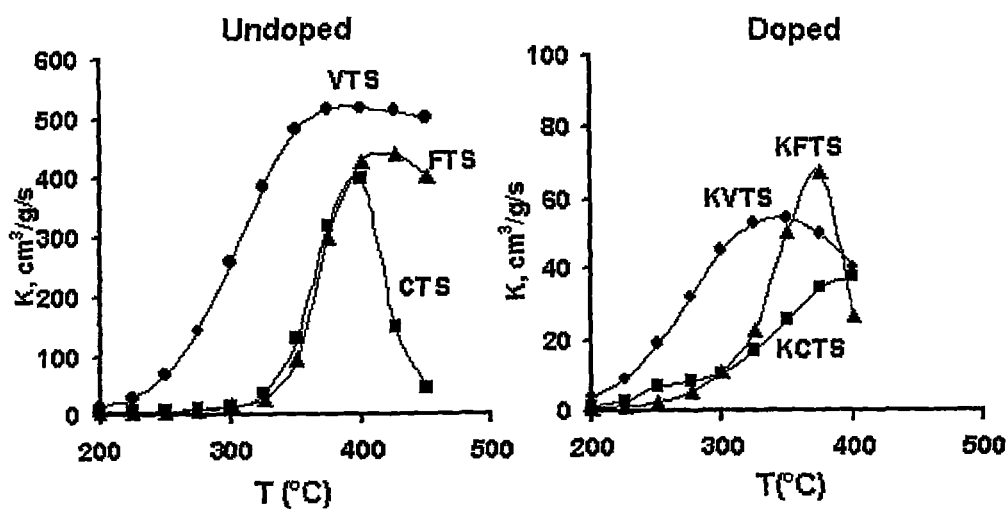
FIG. 6 shows temperature dependency of the first-order rate constant for undoped and K-doped oxides of V, Cu, and Fe supported on sulphated-$TiO_2$.

The results for the undoped systems based on $ZrO_2$ support (FIG. 5) are very similar to the results obtained for $TiO_2$ support (FIG. 4). Vanadium-based and Cu-based catalysts are more active at lower temperatures, while the Fe-based catalyst presumably has maximum activity at temperatures at least 100° C. higher than the V- and Cu-based catalysts. The reason why the Fe-based catalyst of FIGS. 4 and 5 shows a relatively low activity is connected with the difference in the metal content as the Fe-based catalyst has approximately twice lower metal content (se FIG. 2, FZ: 172 μmol Fe/g support; CZ: 376 μmol Cu/g; VZ: 514 μmol Va/g). The activities of the doped catalysts are negligible in comparison with the undoped catalysts.

A completely different picture is observed when using sulphated supports—sulphated $TiO_2$ (FIG. 6) and sulphated $ZrO_2$ (FIG. 7), which supports reveal strong acid properties as determined by the $NH_3$-TPD.

For the undoped vanadium catalysts supported on sulphated $TiO_2$ (FIG. 6) the temperature window is considerably broadened in comparison with the traditional $V_2O_5$/$TiO_2$ undoped catalyst (FIG. 4). The absolute value of the catalytic activity of the undoped catalyst is also somewhat 40-50% higher.

Figure 7:
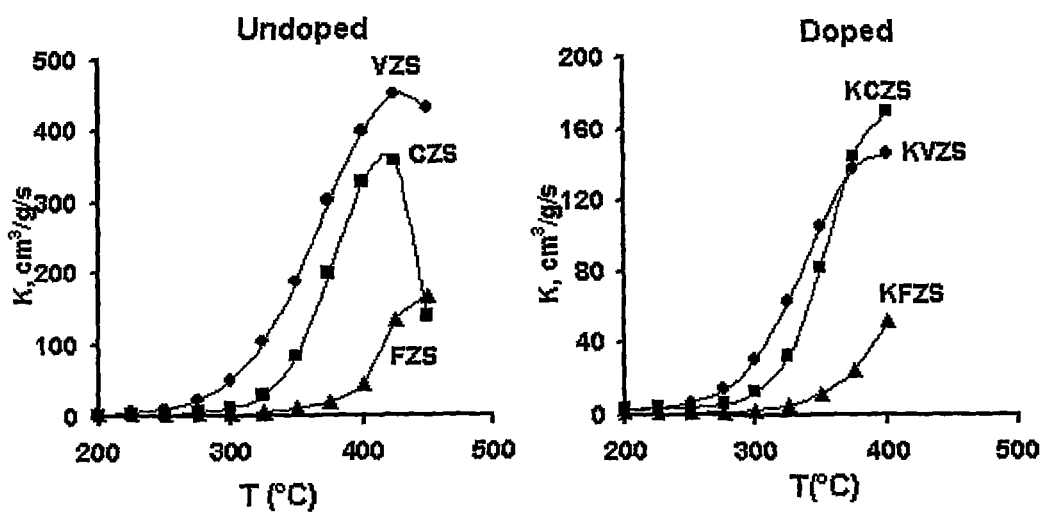
FIG. 7 shows the temperature dependency of the first-order rate constant for undoped and K-doped oxides of V, Cu, and Fe supported on sulphated-$ZrO_2$.

The activity of the undoped $Fe_xO_y$/sulphated-ZrO2 catalyst shown in FIG. 7 is considerably lower than the activity of the $V_2O_5$/sulphated-$ZrO_2$ due to almost twice lower metal content in this sample. The shift of the catalytic activity of the $Fe_xO_y$/sulphated-$ZrO_2$ catalyst towards higher temperatures correlates well with the increase of the overall strength of the acid sites as reflected by $NH_3$-TPD measurements. According to Topsøe et all. [N. Y. Topsøe, H. Topsøe, J. H. Dumesic, J. Catal. 151 (1995) 226; G. Deo, I. Wachs, J. Catal. 146 (1994) 335] the first and rate limiting step in the mechanism of NO SCR is activated adsorption of ammonia on the acid sites of the catalyst. This activation process involves the transfer of hydrogen from $NH_3$ molecule followed by the formation of reduced $V^{4+}$-OH sites. Once ammonia has been activated, NO from the gas phase reacts with the activated ammonia leading to the formation of the intermediate which then decompose to nitrogen and water. In this connection the use of the sulphated catalysts with stronger surface acid sites would lead to the formation of more stable intermediate which would desorb from the surface at higher temperatures, thus shifting the catalytic activity towards higher temperatures.

A peculiar feature, common for all the potassium loaded samples based on sulphated support, was observed: there was a dramatic decrease in the catalytic activity with time at temperatures above 375-400° C. A possible explanation is that deactivation is connected with the decomposition of surface sulphate groups at these conditions. For this purpose thermal stability of sulphated species was studied with the use of FTIR in the presence and absence of water in a previous paper [A. L. Kustov, M. Yu. Kustova, R. Fehrmann, P. Simonsen, Appl. Catal. B 58 (2005) 97]. According to these data, the concentration of surface sulphates remains almost constant up to 400° C. (the loss of the peak intensity is less then 15%). At 500° C. about 25% of the sulphated groups are eliminated and only 50% remains after heating at 700° C. Therefore decomposition of sulphated species could not account for such a dramatic loss of a catalytic activity. At the same time it should be noted that no deactivation with time have been observed for the potassium-doped samples based on non-sulphated carriers such as $TiO_2$ and $ZrO_2$.

At the same time potassium-doped catalysts based on sulphated supports exhibit quite significant remaining catalytical activity at temperatures lower than 375-400° C. (FIG. 6-7), showing good resistance towards poisoning. Moreover, catalysts based on sulphated-$ZrO_2$ reveal considerably higher resistance towards poisoning than catalysts based on sulphated $TiO_2$ and the temperature where rapid deactivation starts is 25-50° C. higher. This is probably connected with considerably higher acidity of sulphated zirconia in comparison with sulphated titania, which enables stronger binding of potassium oxide to the surface sulphated groups of zirconia rather then to the transition metal oxide being responsible for the SCR activity. Moreover it is known that $TiO_2$ is only weakly and reversibly sulphated in these conditions and the stability of the sulphates on the surface of $TiO_2$ is much weaker than on $ZrO_2$ [J. Chen, R. Yang, J. Catal. 139 (1993) 277; M. Waquif, J. Bachelier, O. Saur, J. C. Lavalley, J. Mol. Catal. 72 (1992) 127]. This result indicates that the influence of potassium additives at the temperatures higher than 400° C. is more or less insensitive to the nature of the active metal and represents mainly selective poisoning of the red-ox sites of the catalyst, while the acidic properties of the support has much prominent impact into the resistance of the catalysts.

In order to understand more clearly the phenomenon of the potassium-doped catalysts deactivation at high temperatures, two fresh uncalcined samples of catalysts were prepared: $KNO_3+V_2O_5/TiO_2$ and $KNO_3+V_2O_5$/sulphated-$ZrO_2$.

Figure 8:
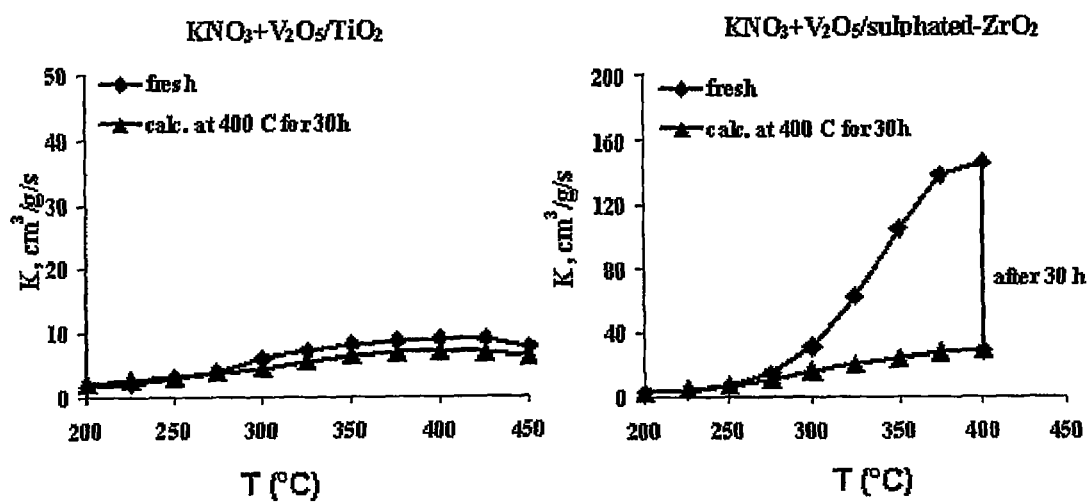
FIG. 8 shows the temperature dependency of the first-order rate constant for the potassium doped catalysts in two states: fresh and calcined for 30 h.

The results for the fresh catalysts were compared with the results obtained for the same catalysts when calcined during 30 h at 400° C. (FIG. 8). It is clearly seen that activity does not change significantly for the fresh and calcined sample based on $TiO_2$, while in the case of sulphated-$ZrO_2$ the deactivation during 30 h at 400° C. is quite severe. Such behavior can be explained if we take into account the fact that the support of sulphated zirconia possesses strong acid sites capable of hosting basic potassium cat ions. Until 375-400° C. the interaction of potassium with sulphated groups of the carrier is strong enough to prevent potassium migration towards active vanadium sites, and poison molecules are located predominantly at the carrier. At higher temperatures potassium migration leads to its preferential localization at the vanadium sites responsible for the SCR activity. Moreover this reaction is irreversible, since cooling of the catalysts below 375° C. does not restore catalytic activity. If we take into account the fact that the amount of these catalytically active Brønsted acid sites is only about 5-10% of all surface acid sites [I. E. Wachs, B. M. Weckhuysen, Appl. Catal. A 137 (1997) 67], then it becomes clear why even small amounts of potassium oxide is enough for the almost complete poisoning of the catalyst.

The results of the TPD-$NH_3$ for undoped and potassium doped catalysts are summarized in the table of FIG. 3. Here, the total amount of adsorbed ammonia, which is determined from the area under the TPD curve, corresponds to molecular adsorbed ammonia on Lewis sites and ammonia adsorbed as ammonium ions on Brønsted acidic hydroxy groups. Furthermore, in TPD-$NH_3$ measurements, the temperature of the maximum ammonia desorption reflects the relative strength of the acid sites.

In all cases the addition of potassium oxide to the catalysts results in a noticeable decrease of total acidity especially in the case of non-sulphated systems, where rather small amounts of potassium oxide (K/V molar ratio=0.4) leads to almost complete depression of the acidity of the catalysts. The remaining acidity in the case of the catalysts supported on non-sulphated $TiO_2$ and $ZrO_2$ correlates well with the remaining catalytical activity, confirming the key role of the ammonia adsorption in the mechanism of NO SCR. It should also be noted that basic molecules of potassium oxide due to electron donation seems to weaken the acid sites, since the $T_{max}$ in potassium-doped systems is shifted towards lower temperature regions indicating weaker ammonia adsorption.

Sulphation procedure leads to the formation of surface sulphate groups, which possess rather strong Lewis acidity. These sulphate groups represent quite attractive sites for hosting potassium oxide due to their significant acidity, and therefore the decrease in total acidity is less in this case. This hypothesis is supported by the considerably higher resistance of the catalyst based on sulphated-$TiO_2$ and $ZrO_2$ at least at lower temperatures, when the activity of potassium doped catalyst approaches the activity of undoped catalysts. At higher temperatures potassium additives become more mobile and are no longer bonded by the sulphated groups of the carrier, which is reflected in the considerable decrease of the activity but does not influence significantly total acidity.

CONCLUSIONS

The results of SCR of NOx reduction by ammonia in combination with biomass firing reveal a shift of the maximum catalytic activity towards higher temperature with increased acidity of the support. The absolute activity of the samples does not vary significantly depending on the nature of the active metal and the acidic properties of the support used, and seem to be influenced mainly by the concentration of active metal.

Therefore, the invention relates to a SCR catalyst optimized for use in biomass fired boiler units, or other processes involving off-gases containing significant amounts of alkali metal and/or alkali-earth compounds. The process comprises the use of a catalyst combined of a porous superacidic support with a metal oxide catalytic component, selected from the group consisting of oxides of Cu, V, Fe, Cr, Mn, Mo and any mixtures thereof. The results for the representative metal oxides Cu, V, Fe impregnated onto the superacidic support are given in FIGS. 7 & 8.

The mechanism of the SCR reaction involves pairs of Lewis and Brønsted acid sites on the catalyst surface of the conventional $V_2O_5/TiO_2$ based catalysts. However, the use of e.g. Cu and Fe as active metal oxides leads a chemically more flexible reaction mechanism, i.e. occurring either via Lewis OR Brønsted sites. Since the alkali or earth alkali poisons deactivate primarily the Brønsted sites, the conventional catalysts are more sensitive to the poisoning.

For all catalysts the use of a superacidic carrier will improve the resistance towards poisoning, since the alkali or earth alkali metals from the fly ash will primarily be attracted to the inactive superacid sites on the carrier, and thus retaining the activity of the metal oxide centers. This extends the lifetime of the operating catalyst according to the invention compared to conventional non-superacidic catalysts.

The invention claimed is:

1. A process for the selective removal of nitrogen oxides in the presence of ammonia from gases containing a significant amount of alkali metal and/or alkali-earth compounds which comprises:
   (a) providing a catalyst by
      (i) forming a porous superacidic support, the superacidic support having an Hammett acidity stronger than $H_0=-12$; and
      (ii) depositing a metal oxide catalytic component on the superacidic support comprising oxides of Fe and Cu and
   (b) exposing gases resulting from the burning of biomass, combined biomass-fossil fuel, or gases emerging from waste incineration units to said catalyst.

2. The process according to claim 1, wherein the metal oxide catalytic component deposited on the superacidic support consists of more than 90% of oxides of Fe, and Cu.

3. The process according to claim 1, wherein the metal oxide catalytic component deposited on the superacidic support consists of any mixture of oxides of Fe and Cu.

4. The process according to claim 1, wherein the metal oxide catalytic component further comprises oxides of V, Cr, Mn, W, Mo, or B.

5. The process according to claim 4, wherein the oxides of W, Mo and B are $WO_3$, $MoO_3$, and $B_2O_3$.

6. The process according to claim 1, which comprises preparing the superacidic support by adsorbing sulfate ions onto one or more amorphous or crystalline inorganic oxides selected from the group consisting of Zr, Ti, Fe, Sn, SI, Al, Hf, and any combination thereof, followed by calcination in air.

7. The process according to claim 6, which comprises preparing the superacidic support by adsorbing sulfate ions onto amorphous or crystalline inorganic one or more oxides selected from the group consisting of $ZrO_2$, $SnO_2$, $TiO_2$, and $Fe_2O_3$.

8. The process according to claim 1, wherein the catalyst comprises a mixture comprising (a) one or more of Fe, Cu, V, Cr, and Mn, and (b) one or more of $WO_3$, $MoO_3$, or $B_2O_3$.

9. The process according to claim 1, wherein the superacidic support has a total porosity of up to $0.80$ $cm^3/cm^3$, and a surface area between 10 and 500 $m^2/g$.

10. The process according to claim 1, wherein a catalytically active metal oxide component is present in an amount of up to 25% by weight.

11. The process according to claim 1, wherein the support is shaped as monolith, extrudate, bead or plate.

12. The process according to claim 1 wherein the metal oxide catalytic component deposited on the superacidic support consists of more than 95% of oxides of Fe and Cu.

13. The process according to claim 1 wherein the metal oxide catalytic component deposited on the superacidic support consists of more than 99% of oxides of Fe and Cu.

14. A catalyst comprising a porous superacid support having a Hammett acidity stronger than $H_0=-12$ and a metal oxide catalytic component on said superacidic support comprising oxides of Fe and Cu.

15. A catalyst according to claim 14, wherein the catalyst is doped with potassium.

16. A process for the selective removal of nitrogen oxides in the presence of ammonia, which comprises exposing gases resulting from the burning of biomass, combined biomass-fossil fuel, or gases emerging from waste incineration units at a temperature from about 150° C. to about 550° C. to a catalyst comprising a porous superacidic support having a Hammett acidity stronger than $H_0=12$ and a metal oxide component comprising oxides of Fe and Cu on the support.

17. The process of claim 16 wherein the temperature is between about 150° C. and 300° C.

18. The process of claim 16 wherein the temperature is between 250° C. and 370° C.

19. The process of claim 16 wherein the temperature is between about 340° C. and 420° C.

* * * * *